United States Patent [19]

Tsuji

[11] Patent Number: 4,589,031
[45] Date of Patent: May 13, 1986

[54] VIDEO CAMERA

[75] Inventor: Sadahiko Tsuji, Kanagawa, Japan

[73] Assignee: Canon Kabushiki Kaisha, Tokyo, Japan

[21] Appl. No.: 506,669

[22] Filed: Jun. 22, 1983

[30] Foreign Application Priority Data

Jun. 30, 1982 [JP] Japan .................................. 57-112745
Jun. 30, 1982 [JP] Japan .................................. 57-112746
Jun. 30, 1982 [JP] Japan .................................. 57-112747

[51] Int. Cl.$^4$ ........................ H04N 5/232; H04N 5/30
[52] U.S. Cl. ...................................... 358/227; 358/224
[58] Field of Search ............... 358/227, 224, 222, 183; 354/105, 409; 340/705

[56] References Cited

U.S. PATENT DOCUMENTS

| 3,617,633 | 11/1971 | Barr et al. | |
| 3,617,663 | 11/1968 | Barr | 358/227 |
| 4,284,335 | 8/1981 | Takamae et al. | 354/409 |
| 4,432,014 | 2/1984 | Roos et al. | 358/224 |

OTHER PUBLICATIONS

"Minolta Hi-Matic Line", p. 5, 11/21/80.

Primary Examiner—Gene Z. Rubinson
Assistant Examiner—Stephen Brinich
Attorney, Agent, or Firm—Toren, McGeady, Stanger, Goldberg & Kiel

[57] ABSTRACT

Disclosed is a video camera in which the field of view of an automatic focusing device is displayed on an electronic view finder, and the displayed field of view is adjustable in accordance with the object distance and/or the zooming state of the lens system.

10 Claims, 11 Drawing Figures

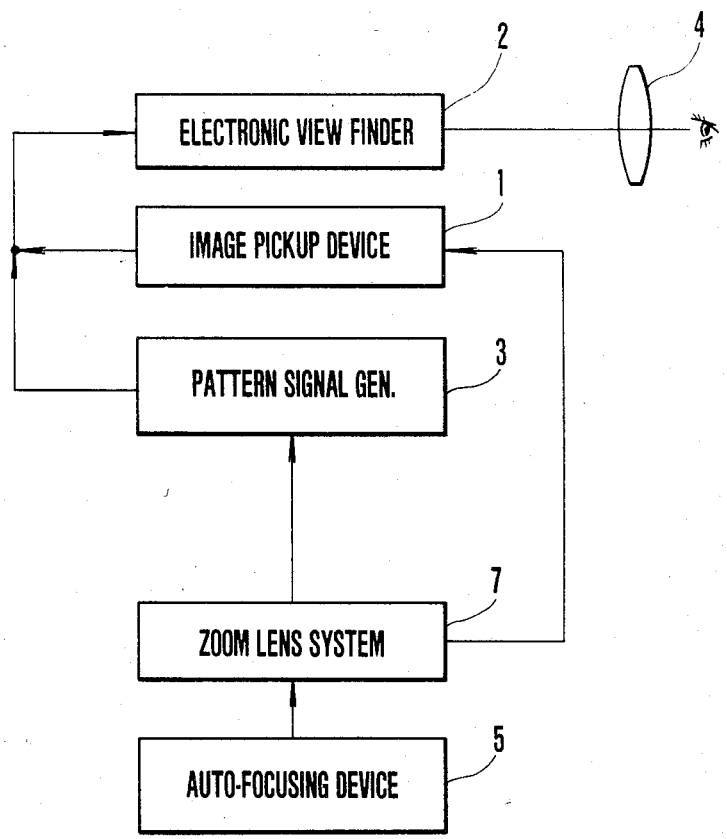
F I G.10

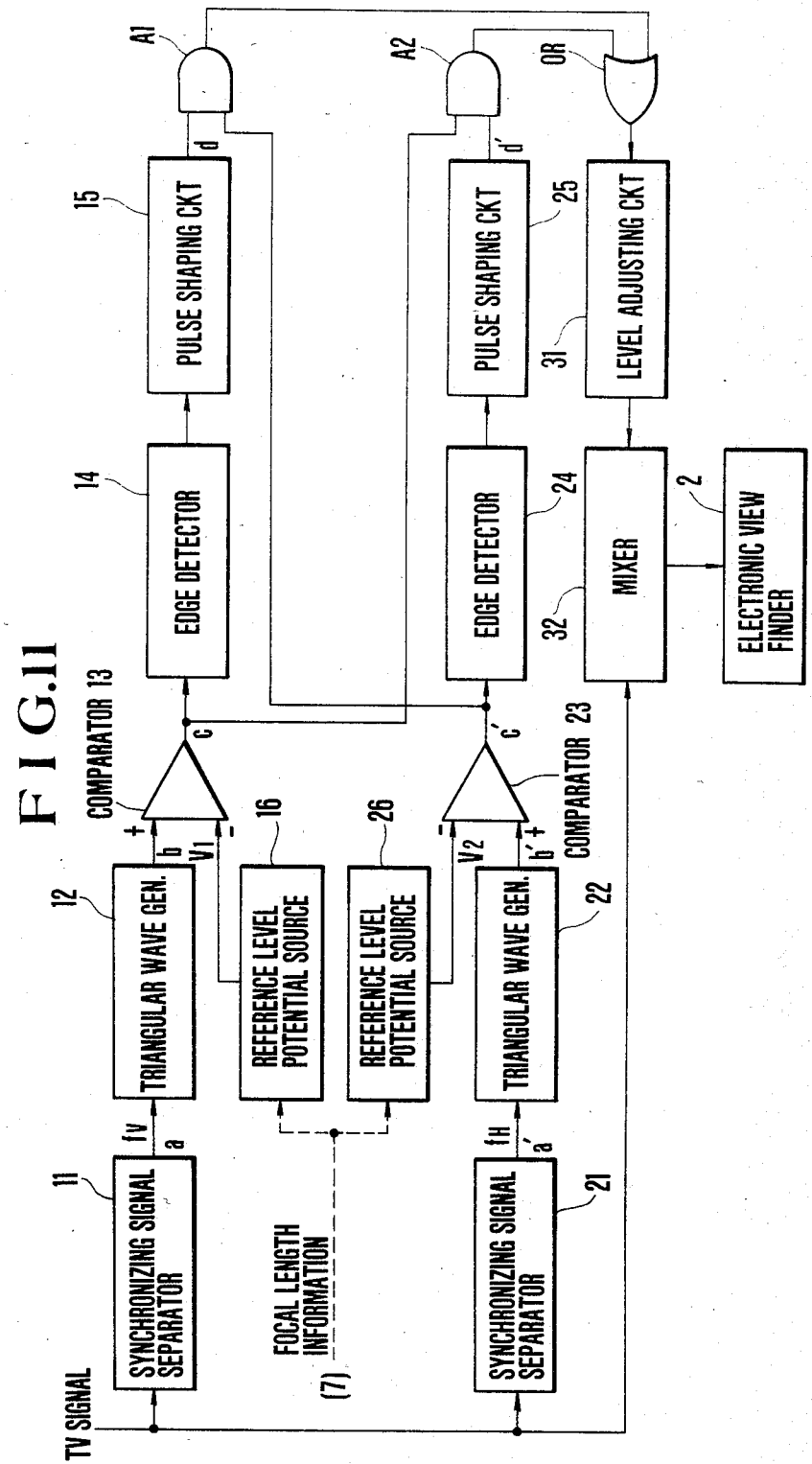

VIDEO CAMERA

BACKGROUND OF THE INVENTION:

1. Field of the Invention

This invention relates to video cameras and more particularly to video cameras provided with object-distance and/or focus detecting devices.

2. Description of the Prior Art

A wide variety of techniques for displaying a rangefinder's view field have been proposed for 8 mm cameras and still cameras equipped with automatic focusing devices. However, such techniques are adapted to be used with optical finders, and to display the image in a viewfinder frame or means equivalent thereto. Therefore, they are hardly applicable to video cameras having electronic viewfinders. However, the art of video cameras also requires some means to display the rangefinder area for automatic focus adjustment.

SUMMARY OF THE INVENTION

It is an object of the present invention to provide a video camera with automatic means of simple structure making it possible to display a range finding area in the field of view of the electronic view finder without altering the form of the electronic view finder.

For achieving the object, according to an embodiment of the invention, it is proposed to provide the video camera with a device for producing a pattern signal representative of the field of view of the external rangefinder, and means responsive to the output of this pattern signal generating device for displaying a rangefinder area in the field of view of the electronic view finder.

Another object of the present invention is to provide a video camera having an external rangefinder with automatic means of concise structure for making it possible not only to display a rangefinder area in the field of view of the electronic view finder without altering the form of the electronic view finder but also to change the position and size of the rangefinder area in accordance with the object distance.

For this object, according to another embodiment of the invention, it is proposed to provide the video camera with a pattern signal generator for producing a pattern signal representative of the field of view of the external rangefinder, means for making changeable the pattern signal of said pattern signal generator in accordance with the object distance information, and means responsive to the output of said pattern signal generator for displaying a rangefinder area in the field of view of the electronic view finder.

A further object of the invention is to provide a video camera with automatic means of concise structure for making it possible not only to display a rangefinder area in the field of view of the electronic view finder without altering the form of the electronic view finder, but also to establish an operative connection between zooming and changing of the rangefinder area display.

Therefore, according to another embodiment of the invention, it is proposed to provide a video camera with a pattern signal generator for producing a pattern signal representative of the field of view of the external rangefinder, means for making the pattern signal of said pattern signal generator changeable in response to zooming of a zoom lens for photography, and means responsive to the output of said pattern signal generator for displaying a rangefinder area in the field of view of the electronic view finder.

These and other objects and features of the invention will become apparent from the following description of embodiments thereof taken in connection with the accompanying drawings.

BRIEF DESCRIPTION OF THE DRAWINGS

In the following, the present invention is described in connection with preferred embodiments thereof by reference to the accompanying drawings in which:

FIG. 10 is a schematic representation of another example of the video camera embodying the present invention.

FIG. 11 is a block diagram of the pattern signal generator of FIG. 10.

DETAILED DESCRIPTION OF THE PREFERRED EMODIMENTS

Figure 1:
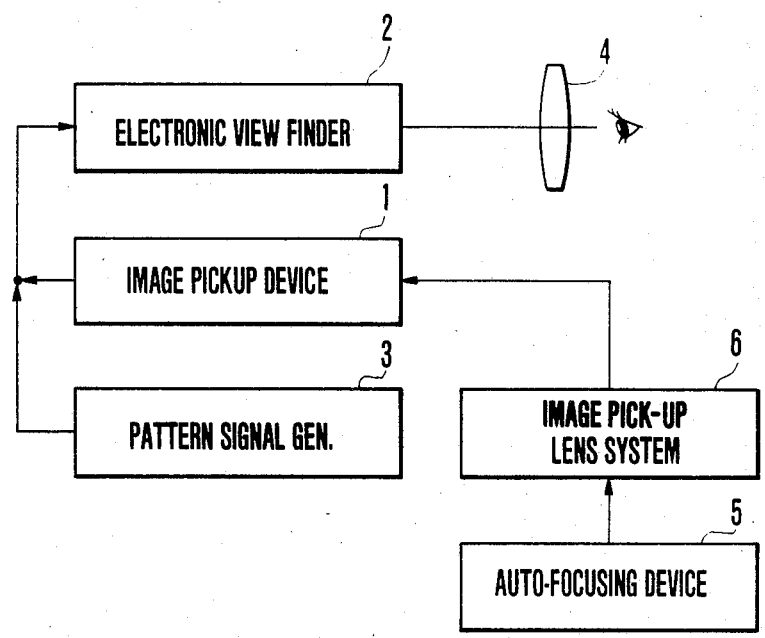
FIG. 1 is a schematic representation of an example of the video camera embodying the present invention.

FIG. 1 schematically illustrates the entire system of a video camera according to one embodiment of the present invention, which includes an image pickup device 1, an electronic view finder 2, a pattern signal generator 3, an image pick-up lens system 6 and an automatic focus adjusting device 5 of the external rangefinder type. The image pickup device 1 includes a photo-signal-to-electrical signal converter, such as a pickup tube or solid state imaging element, and a video signal processor. The electronic view finder 2 includes a display device, such as a cathode ray tube or panel display and a circuit for controlling the operation of the display device in accordance with the video signals. Since these component parts are well known to those skilled in the art, no further detailed explanation is given here. The pattern signal generator 3 is, in this instance, constructed so that, as is described in greater detail with reference to FIG. 2, when applied to the electronic view finder 2, its output signal presents a display of a rangefinder area, for example, in the form of a rectangular frame, on its display surface. The electronic view finder 2 is capable, upon receiving the video signals from the image pickup device 1 and the signal from the pattern signal generator 3, of displaying both of the images at a time on the display surface of, for example, the cathode ray tube. By making the output signal from the pattern signal generator 3 represent a frame defining the field of view of the rangefinder for the automatic focus adjusting device 5, the electronic view finder 2 can display information representative of the rangefinder area. An additional part 4 in the drawing is an eyepiece.

Figure 2:
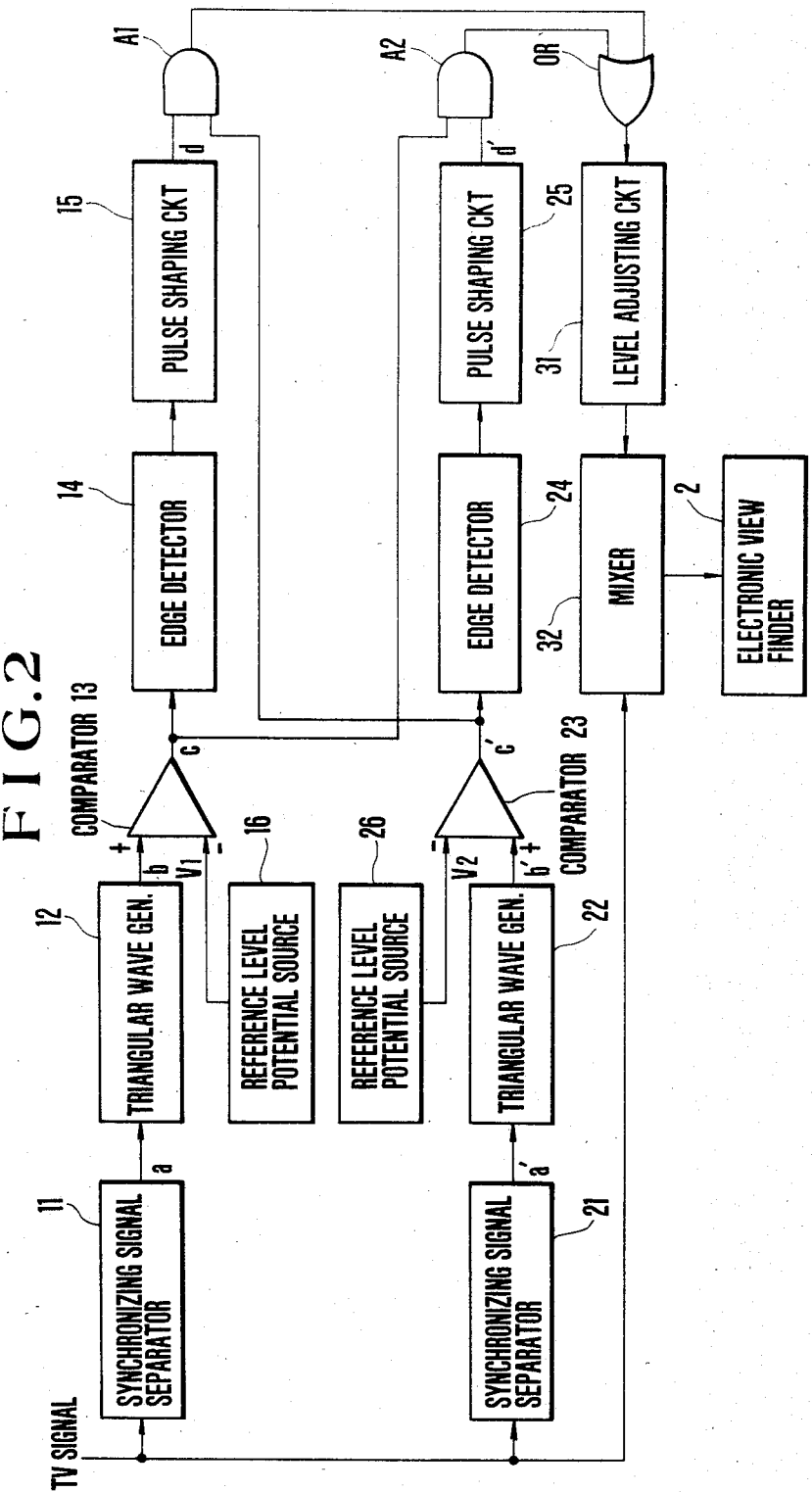
FIG. 2 is a block diagram of the pattern signal generator of FIG. 1.
Figure 3:
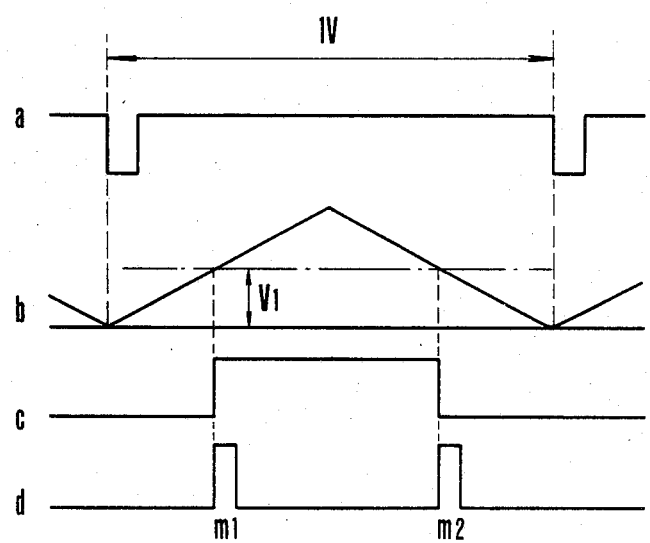
FIGS. 3 and 4 are wave form diagrams illustrating a manner in which the generator of FIG. 2 operates.

FIG. 2 illustrates an example of the pattern signal generator 3 of FIG. 1 where a series of vertical synchronizing signals and a series of horizontal synchronizing signals are correlated to each other in pairs. A synchronizing signal separation circuit 11 processes TV signals to produce a vertical synchronizing signal (FIG. 3a), which is then applied to a triangular wave forming circuit 12. The triangular wave (FIG. 3b) is compared with a potential V1 of a reference level potential source 16 by a comparing circuit 13 so that part of the wave which is above this reference potential V1 is clipped, thus giving off a square wave (FIG. 3c). The square wave is then applied to an edge detection circuit 14 which then produces signals corresponding to the rising and falling edges of the wave, to be shaped by a pulse shaping circuit 15 (FIG. 3d). To produce a train of the triangular waves at the same frequency as that of the vertical synchronizing signals, use may be made of a counter reversible between up-counting and down-counting operations and arranged to operate at the same frequency as that of the signals. The edge detection circuit 14, uses an exclusive OR logic circuit receptive of the wave of FIG. 3c and a wave obtained by delaying that wave for a predetermined time, or a circuit for differentiating the wave of FIG. 3c to form a single-pole pulse.

Figure 4:
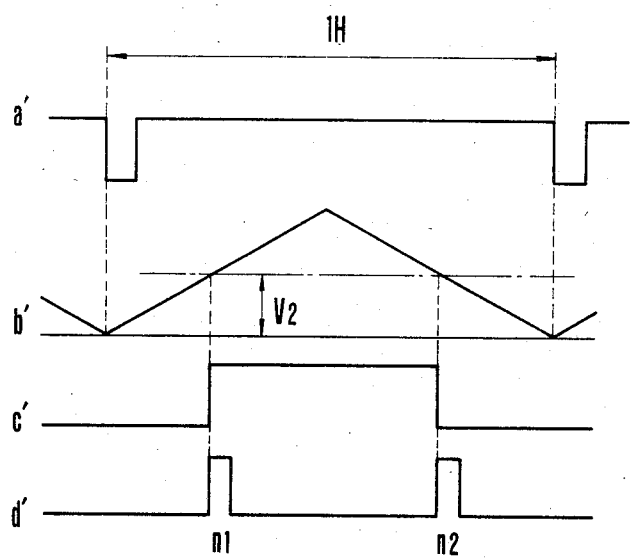

As, as to horizontal synchronizing signals, equivalent circuits 21 through 26 effect similar conversions and produce the wave forms of FIGS. 4a' through 4d' in the respective steps of the process. The waves of FIGS. 3a-3d and 4a' to 4d' are depicted as different only in time scale, but analogous to each other in form.

An AND circuit A1 of FIG. 2 receives the output of the pulse shaping circuit 15 (FIG. 3d) and the output of the comparing circuit 23 (FIG. 4c') the former being repeated at the same frequency as that of the vertical synchronizing signals, and the latter at the same frequency as that of the horizontal synchronizing signal. The time position of the pulse, ml, of FIG. 3d determines the location of the upper side of a rangefinder frame, or $\overline{PS}$ (see FIG. 5) on the y-axis in the field of view of the electronic view finder, the time position of the second pulse m2 determines the lower side of the same frame, or $\overline{QR}$. Therefore, responsive to the waves (FIG. 4c') of the same frequency as that of the horizontal synchronizing signals, and those first and second pulses m1 and m2, the AND circuit A1 produces a signal for bright lines $\overline{PS}$ and $\overline{QR}$ on the display surface at the output thereof. It is to be noted here that if each of the pulses m1 and m2 contains k waves of FIG. 4c', the width of the bright line corresponds to k scanning lines.

Similarly a second AND circuit A2 receives the output (FIG. 4d') of the pulse shaping circuit 25, and the output (FIG. 3c) of the comparing circuit 13. The time position of the first pulse n1 of FIG. 4d' determines the location of the left hand side of the rangefinder frame, namely, $\overline{PQ}$ on the x-axis of FIG. 5, and the time position of the second pulse n2 similarly determines the location of the right hand side of the same frame, or $\overline{SR}$. Therefore, in response to the waves of FIG. 3c of the same frequency as that of the vertical synchronizing signals and those pulses n1 and n2, the AND circuit A2 produces two bright points for every one horizontal scanning line within a period in which the signal of FIG. 3c goes high, on the display surface of FIG. 5.

The outputs of the AND circuits A1 and A2 are applied through an OR circuit OR to a level adjusting circuit 31. The output of the level adjusting circuit 31 is mixed with video signals by a mixing circuit 32 and from there sent to the electronic view finder 2. When the aforesaid rangefinder frame control signal is adjusted to a saturated level by the level adjusting circuit 31 before it is mixed with the video signals by the mixing circuit 32, a display of the rangefinder area in a white frame is presented. When the mixing is effected in such a relation that the rangefinder frame control signal erases the corresponding part of the video signal, an alternative display of the rangefinder area in a black frame is obtained.

It should be pointed out in connection with the abovedescribed generator that as the reference levels V1 and V2 (see FIG. 3) are made to change, the size of the rangefinder frame changes. Also as the phase of the triangular wave (FIG. 3b and FIG. 4b') is made to change, the location of the rangefinder area in an external rangefinder type of automatic focus adjusting device where the photographic optical system and the rangefinder optical system are isolated from each other, a failure in coincidence of their optical axes results in a parallax, whose magnitude changes with the object distance and zooming. On this account, the above-described system, if necessary, includes an additional means for controlling the operation of the triangular wave forming circuits 12 and 22 of the pattern signal generator 3 in accordance with a parallax correction factor, as information representing the distance from the camera to the object are given from the automatic focus adjusting device to the reference level potential sources 15 and 26. Hence a parallax-free rangefinder area can be displayed. If the object distance information is given off not directly from the range finder of the automatic focus adjusting device, but read out from the in-focus position of the focusing lens member of the photographic lens system, data representing the adjusted position of the focusing lens member are given as the object distance to the pattern signal generator 3.

Figure 6:
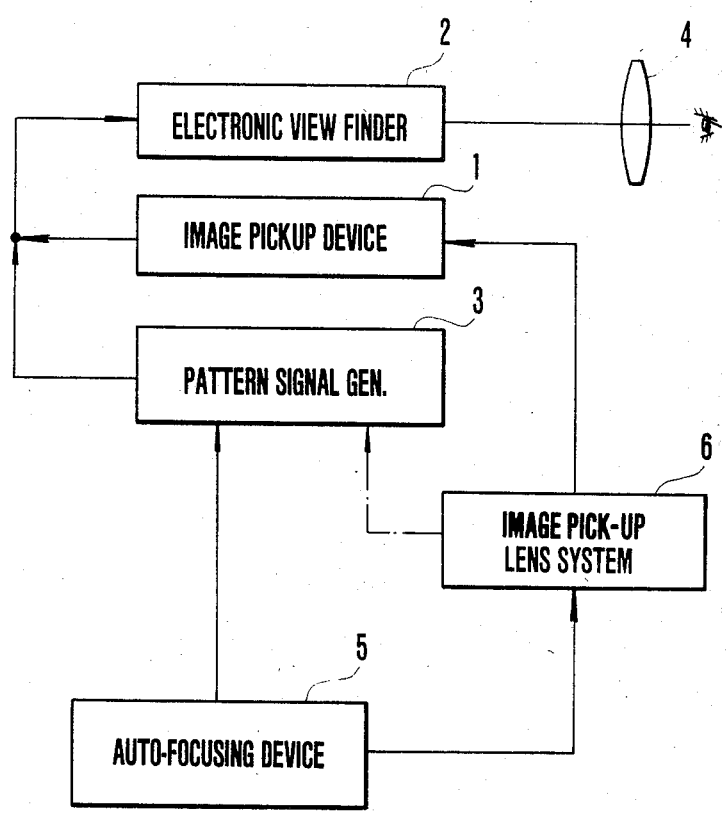
FIG. 6 is a schematic representation of another example of the video camera embodying the present invention.
Figure 7:
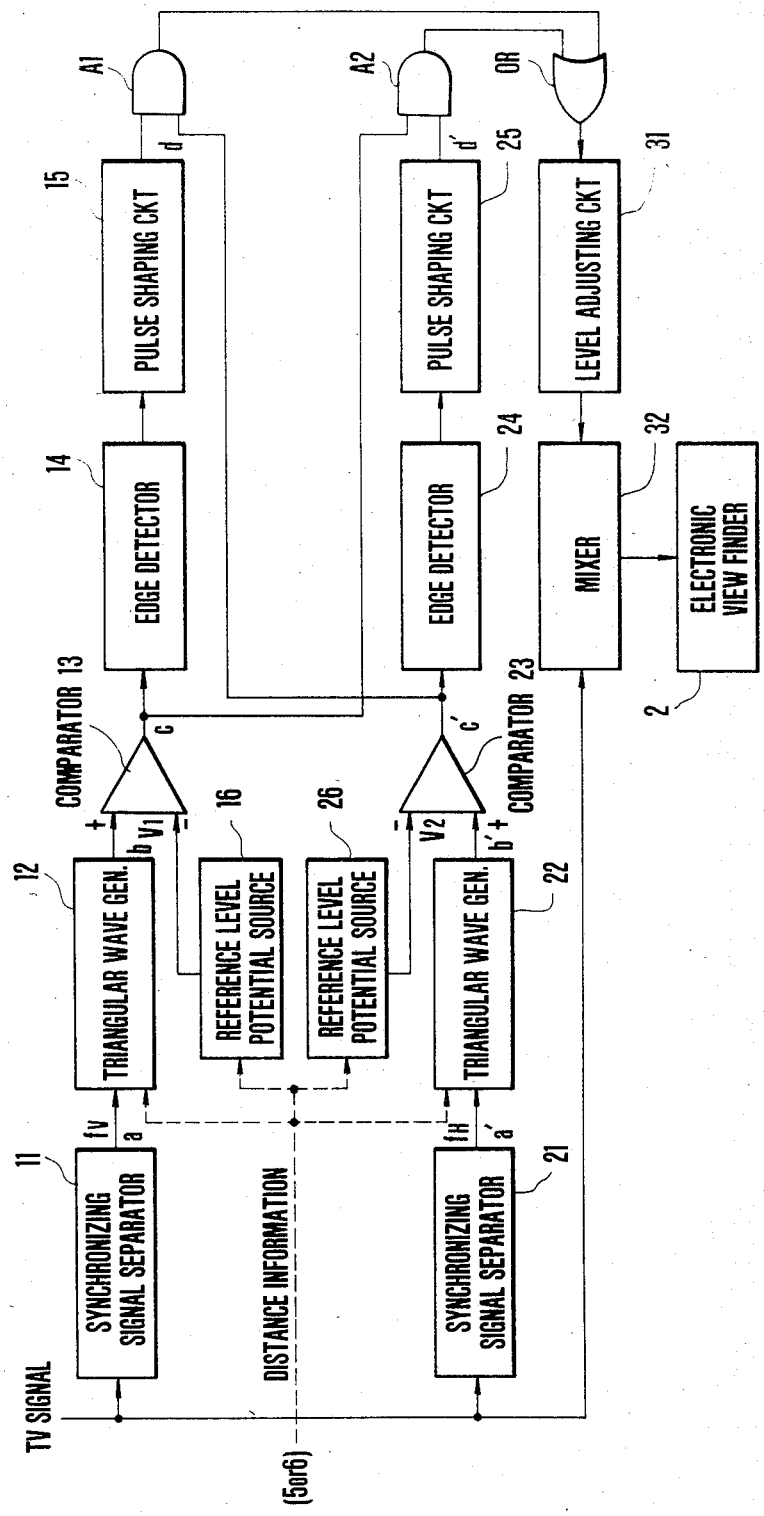
FIG. 7 is a block diagram of the pattern signal generator of FIG. 6.
Figure 8:
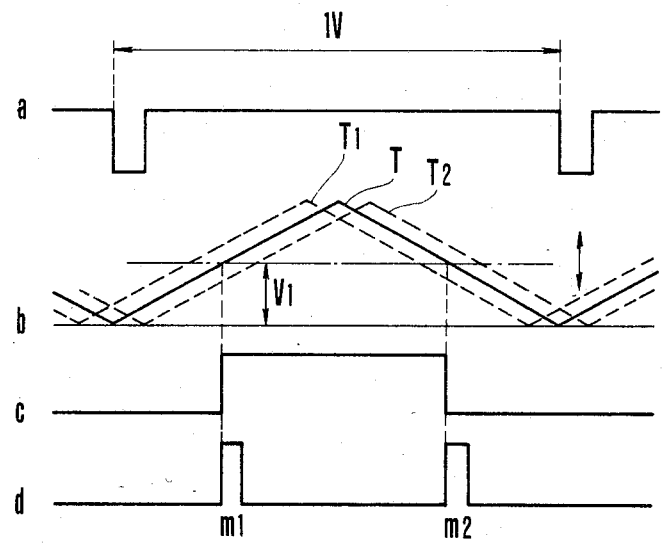
FIGS. 8 and 9 are wave-form diagrams illustrating a manner in which the generator of FIG. 7 operates.
Figure 9:
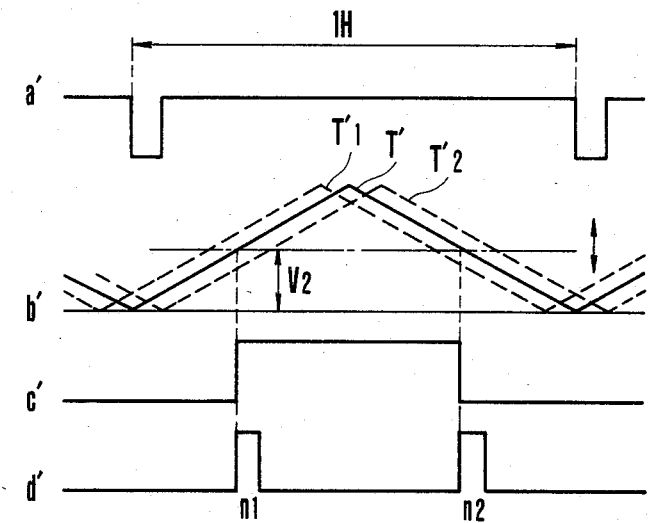

An example of adaptation to such a situation is described by reference to FIGS. 6 through 9. In FIGS. 6 and 7, reference numerals which are the same as those in FIGS. 1 and 2 denote similar parts.

The system of FIG. 6 is different from the system of FIG. 1 in that the distance information from the external rangefinder type automatic focus adjusting device 5 is applied to the pattern signal generator 3. Where the automatic focus adjusting device does not give the information directly, and the arrested position of the focusing lens member of the image pick-up lens system 6 for the in-focus condition serves as the distance information instead, this positional information of the focusing lens member is given as the distance information to the pattern signal generator 3 as indicated schematically by a dot-and-dash line.

Since, as has been mentioned above, the electronic view finder 2 responds to the video signals from the image pickup device 1 and the signals from the pattern signal generator 3 and can display both of their images at a time on the display surface of, for example, a cathode ray tube. At this time, the signal of the pattern signal generator 3 form a pattern corresponding to a frame for indicating a rangefinder area to thereby make the electronic view finder 2 display the information representatiave of the field of view of the rangefinder. Thus by controlling the operation of the pattern signal generator 3 in accordance with the aforesaid distance information the electronic view finder 2 can present a display of the rangefinder area variable in position and size dependent upon the object distance in its field of view.

Figure 5:
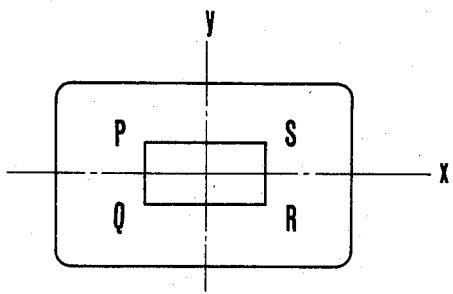
FIG. 5 is a plan view of an example of the display of a rangefinder area in the field of view of the electronic view finder.

In connection with the shift in position of the rangefinder area by the distance information it should be explained that a signal representative of this distance information is applied through, for example, a mechanical or electrical connection to the triangular wave forming circuit 12 or 22 as shown in FIG. 7. This makes the phase of the wave produced change from the start point T or T' in FIG. 8b or 9b' to a point T1 or T2, or T1' or T2' respectively. Thus, the frame PQRS of FIG. 5 changes its position vertically or horizontally. Where the triangular wave forming circuit 12 or 22 is constructed with a counter of the above-described up-and-down reversible type, the numerical value of count start needs only to change. As the orientation of the rangefinder optical system changes and, in the case of the scanning type of rangefinder system, as the target scanning changes, the location of the rangefinder area in the field of view of the electronic view finder must be changed. Further since, as the object distance changes, the image magnification of the photographic lens changes, causing the amount of parallax to change, correction of the parallax in this sense is also carried out by changing the size of the rangefinder area depending upon the object distance. To effect the change of the size of the rangefinder area in response to the distance information, a signal representing the distance information is applied through a mechanical or electrical connection to either or both of the reference level potential sources 16 and 26, so that either or both of the clip levels V1 and V2 in FIGS. 8b and 9b' is or are made to change. Thus, the size of the displayed frame PQRS of FIG. 5 is changed.

It will be appreciated that according to this embodiment, the rangefinder area corrected for the parallax due to the external provision of the rangefinder can be set up in the field of view of the electronic view finder.

The foregoing description is connected to factoring of the object distance into the parallax correction. Where the photographic lens system is of the zoom type, information representative of variation of the focal length with zooming may be applied to the reference level potential sources 16 and 26, thereby making it possible to change the size of the rangefinder area with zooming.

An example of adaptation to such situation is be described in connection with FIGS. 10 and 11 where the same reference numerals have been employed to denote the similar parts to those shown in FIGS. 1, 2, 6 and 7.

In FIG. 10, a zoom lens system 7 provides focal length information while zooming to the pattern signal generator 3. The focal length information can be obtained from the angle of rotation of the zoom ring, or the position of the variator.

As has been mentioned before, the electronic view finder 2 responds to the video signals from the image pickup device 1 and the signals from the pattern signal generator 3 and can display both of their images at a time on the display surface of, for example, its cathode ray tube. At this time, the signal of the pattern signal generator 3 is made to represent a pattern corresponding to a frame for indicating a rangefinder area to thereby make the electronic view finder 2 display the information representative of the field of view of the rangefinder. Hence by controlling the operation of the pattern signal generator in accordance with the aforesaid focal length information, as the target area changes with zooming, the corresponding rangefinder area can be displayed in the field of view of the electronic view finder.

The aforesaid focal length information obtained from the angular position of the zoom ring, or the axial position of the variator is applied to the reference level potential sources 16 and 25 as shown in FIG. 11. For this purpose, mechanical or electrical interconnection may be used in adjusting the reference potential level of the source automatically, or by manual operation. This changes the clip levels V1 and V2 in FIGS. 3b and 4b' with change in the size of the frame PQRS in FIG. 5. Thus, as the zoom lens system 7 is being zoomed, the electronic view finder 2 can present changing displays of the rangefinder area in its field of view. For example, as zooming goes from the wide angle to the telephoto positions, the size of the rangefinder area gradually increases.

The correction of the rangefinder area for zooming shown in FIGS. 10 and 11 and the correction of the rangefinder area for the object distance shown by FIGS. 6 to 9 may be carried out in combination.

Though the foregoing examples have been described in connection with the rectangular display of the rangefinder area, modifications may be made by altering the circuit means in accordance with the shape of the frame of the rangefinder area, or by utilizing a solid state memory device so that a signal representing the required shape of the frame of the rangefinder area is produced.

The present invention has achieved the possibility of presenting a display of the desired rangefinder area in the field of view of an electronic view finder by a system of concise structure without involving any alteration of the construction of the electronic view finder. Also it makes it possible to factor the object distance into the variation of the size and position of the rangefinder area. Moreover, the rangefinder area automatically corrected for the parallax due to the external provision of the rangefinder can be displayed. The use of the interconnection between the zooming and the display of the rangefinder area provides great improvements in the manageability of the zoom lens-equipped video cameras.

In the foregoing embodiments, a the automatic focus adjusting device 5, may be made of either the passive type (image sharpness detection, two-image coincidence detection) or the active type (the light projection system, supersonic system, radar system) known to those skilled in the art.

What I claim:
1. A video camera comprising:
(A) image pick-up means including a focus adjustable lens system and for producing a video signal representative of an image of an object, said lens system defining an optical path;
(B) focus detecting means for detecting the focus of said lens system relative to said object, said detecting means having a field of view;
(C) pattern generating means for generating a pattern signal indicative of said field of view of said focus detecting means;
(D) display means responsive to said video signal and said pattern signal for displaying the object image and the field of view of the focus detecting means; and
(E) adjusting means for adjusting said pattern signal generated from said pattern generating means; and

(F) said focus detecting means being arranged to produce a distance signal indicative of a distance to the object, and said adjusting means being responsive to said distance signal and being arranged to adjust said pattern signal in accordance with the object distance.

2. A video camera comprising:
(A) image pick-up means including a focus adjustable lens system and for producing a video signal representative of an image of an object, said lens system defining an optical path;
(B) focus detecting means for detecting the focus of said lens system relative to said object, said detecting means having a field of view;
(C) pattern generating means for generating a pattern signal indicative of said field of view of said focus detecting means;
(D) display means responsive to said video signal and said pattern signal for displaying the object image and the field of view of the focus detecting means ;and
(E) adjusting means for adjusting said pattern signal generated from said pattern generating means; and
(F) said adjusting means being operatively associated with said lens system and being arranged to adjust said pattern signal in accordance with the adjusted position of the lens system.

3. A video camera according to claim 1, wherein said lens system includes zoom effecting means, and said adjusting means is operatively associated with said zoom effecting means and is arranged to adjust said pattern signal in accordance with the zooming condition of the lens system.

4. A video camera according to claim 2, wherein said lens system includes zoom effecting means, and said adjusting means is operatively associated with said zoom effecting means and is arranged to adjust said pattern signal in accordance with the zooming condition of the lens system.

5. A video camera comprising:
(A) image pick-up means including a focus adjustable lens system and for producing a video signal representative of an image of an object, said lens system defining an optical path;
(B) focus detecting means for detecting the focus of said lens system relative to said object, said detecting means having a field of view;
(C) pattern generating means for generating a pattern signal indicative of said field of view of said focus detecting means;
(D) display means responsive to said video signal and said pattern signal for displaying the object image and the field of view of the focus detecting means; and
(E) adjusting means for adjusting said pattern signal generated from said pattern generating means; and
(F) said lens system including zoom effecting means, and said adjusting means being operatively associated wtih said zoom effecting means and being arranged to adjust said pattern signal in accordance with the zooming condition of the lens system.

6. A video camera according to claim 1, wherein said detecting means is located outside of the optical path of said lens system to sense the object.

7. A video camera according to claim 2, wherein said detecting means is located outside of the path of said lens system to sense the object.

8. A video camera according to claim 3, wherein said detecting means is located outside of the path of said lens system to sense the object.

9. A video camera according to claim 4, wherein said detecting means is located outside of the path of said lens system to sense the object.

10. A video camera according to claim 5, wherein said detecting means is located outside of the path of said lens system to sense the object.

* * * * *